United States Patent
Mark et al.

(10) Patent No.: US 12,208,352 B2
(45) Date of Patent: *Jan. 28, 2025

(54) AIR FILTER FOR COMPRESSED AIR

(71) Applicant: Ingersoll-Rand Industrial U.S., Inc., Davidson, NC (US)

(72) Inventors: Henry Y. Mark, Philadelphia, PA (US); Janez Jakop, Logatec (SI); Scott A. Johnson, Honey Brook, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,328

(22) Filed: May 1, 2023

(65) Prior Publication Data

US 2023/0264127 A1     Aug. 24, 2023

Related U.S. Application Data

(63) Continuation of application No. 17/025,443, filed on Sep. 18, 2020, now Pat. No. 11,673,085.

(51) Int. Cl.
    *B01D 46/00*      (2022.01)
    *B01D 46/24*      (2006.01)
    (Continued)

(52) U.S. Cl.
    CPC ..... *B01D 46/0004* (2013.01); *B01D 46/2403* (2013.01); *B01D 46/4272* (2013.01); *B01D 46/60* (2022.01); *B01D 2265/028* (2013.01); *B01D 2265/029* (2013.01); *B01D 2273/10* (2013.01)

(58) Field of Classification Search
CPC .... B01D 46/0004; B01D 46/58; B01D 46/60; B01D 46/24; B01D 46/2403; B01D 46/2411; B01D 46/4272; B01D 2273/10; B01D 2265/028; B01D 2265/029
See application file for complete search history.

(56) References Cited

U.S. PATENT DOCUMENTS 4,522,717 A     6/1985   Brust
RE31,966 E   *   8/1985   Sillers, Jr. .......... B01D 46/2407
                                                  55/357

(Continued)

FOREIGN PATENT DOCUMENTS

CN             107670430 A     2/2018

OTHER PUBLICATIONS

Extended European Search Report for European Application No. 21170877.1, dated Oct. 1, 2021 (date of completion of the search Sep. 15, 2021).

(Continued)

*Primary Examiner* — Robert Clemente
(74) *Attorney, Agent, or Firm* — Kevin E. West; Advent, LLP

(57) ABSTRACT

A filter for compressed air systems is provided. The filter includes a filter housing with a filter therein between an air inlet and an air outlet. Compressed air flowing between the air inlet and the air outlet passes through the filter housing and the filter element. A base is removably fastened to the filter housing which may be separated from the filter housing to allow the filter element to be removed and replaced.

16 Claims, 8 Drawing Sheets

(51) Int. Cl.
  *B01D 46/42* (2006.01)
  *B01D 46/60* (2022.01)

(56) References Cited

U.S. PATENT DOCUMENTS

| | | | |
|---|---|---|---|
| 5,919,284 | A | 7/1999 | Perry, Jr. et al. |
| 6,168,647 | B1 | 1/2001 | Perry, Jr. et al. |
| 7,108,738 | B2 | 9/2006 | Burns et al. |
| 11,673,085 | B2 * | 6/2023 | Mark .................. B01D 46/446 55/314 |
| 2003/0110949 | A1 | 6/2003 | Fornof et al. |
| 2005/0120687 | A1 | 6/2005 | Casey et al. |
| 2006/0207426 | A1 | 9/2006 | Platt et al. |
| 2007/0095746 | A1 | 5/2007 | Minichello et al. |
| 2012/0210688 | A1 | 8/2012 | Burns et al. |
| 2012/0273433 | A1 | 11/2012 | Wessels et al. |
| 2014/0331624 | A1 | 11/2014 | Jodi et al. |
| 2015/0014256 | A1 | 1/2015 | Koreis et al. |
| 2015/0107205 | A1 | 4/2015 | Hartog |
| 2016/0023153 | A1 | 1/2016 | Burns |
| 2017/0014745 | A1 | 1/2017 | Zuerker et al. |
| 2017/0232375 | A1 | 8/2017 | Fukuhara |
| 2018/0236388 | A1 | 8/2018 | Harris et al. |
| 2019/0217237 | A1 | 7/2019 | Cloud et al. |
| 2021/0046409 | A1 | 2/2021 | Grein et al. |
| 2021/0229019 | A1 | 7/2021 | Boel et al. |

OTHER PUBLICATIONS

Communication pursuant to Article 94(3) EPC in Europe for Application No. 21170877.1, dated May 11, 2023.
Examination Report for European Application No. 21170877.1, dated Nov. 8, 2023.

* cited by examiner

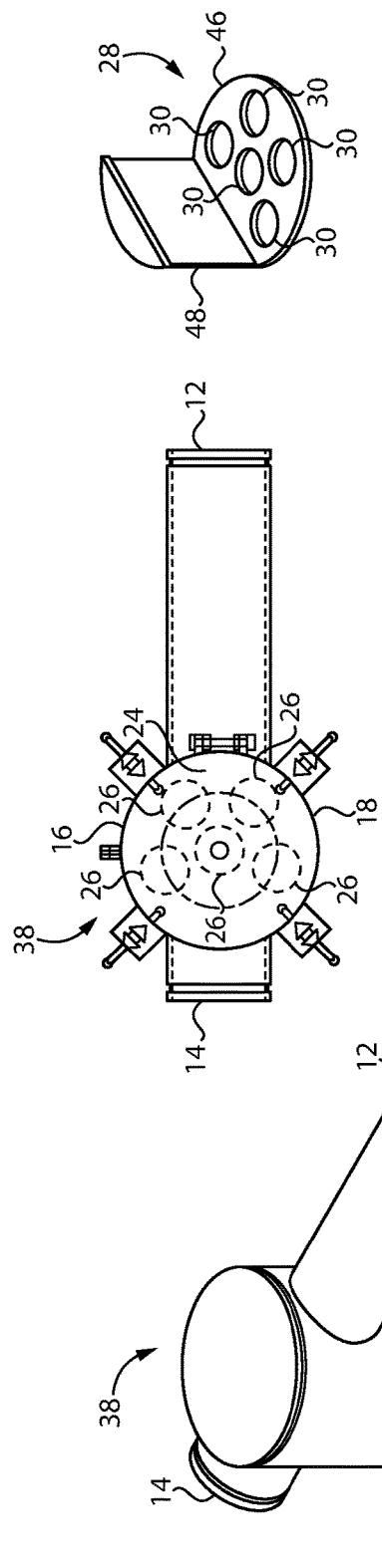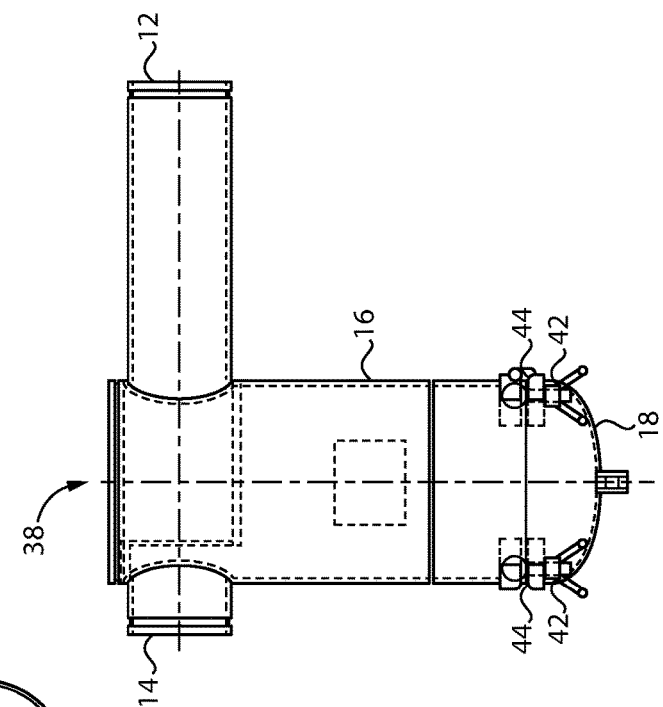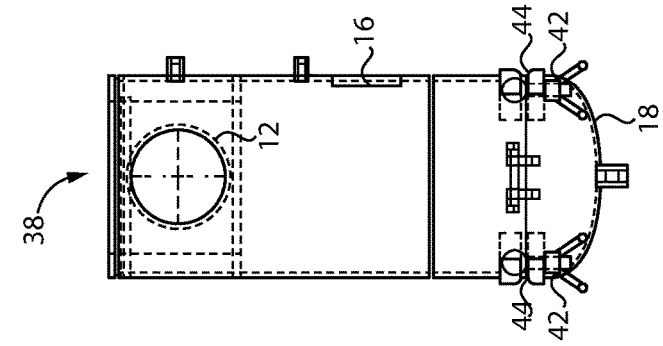

AIR FILTER FOR COMPRESSED AIR

BACKGROUND

The present inventions relate generally to industrial air dryers for compressed air systems.

Compressed air is commonly used in factories to power pneumatic tools and to blow air onto various surfaces for cleaning, expanding bags, moving parts, etc. Typically, factories have a centralized compressed air system installed that feeds a network of compressed air piping that supplies numerous tools or stations with compressed air. Thus, one or more centralized air compressors may be used to supply an entire factory space with compressed air.

However, it is known that air compressors which draw air from the surrounding atmosphere also introduce moisture into the compressed air from the water vapor naturally contained in atmospheric air. Although it is common to use an air dryer in a compressed air system to remove moisture from the compressed air, corrosion can still occur within pipes conveying the compressed air from the compressor to the air dryer. As a result, corroded particles from the compressed air pipes may enter the air dryer and cause damage to the dryer. It is also possible that other foreign particles may be introduced into the compressed air pipes from the compressor or other sources. Thus, it is desirable to filter the compressed air before the air passes through the air dryer. However, with current compressed air filters, it can be difficult to remove and replace the filter dement in the air filter. Thus, the inventors believe improved air filters would be desirable.

SUMMARY

A filter for compressed air systems is described. The filter may be used to filter foreign particles from compressed air before the compressed air enters an air dryer. The filter includes an air inlet and an air outlet and a filter housing therebetween. A filter dement is located in the filter housing such that compressed air flowing from the air inlet to the air outlet passes through the filter element to filter out foreign particles. A removable base is fastened to the filter housing which may be separated therefrom to allow the filter element be removed and replaced. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which:

FIG. 5 is a perspective view of another embodiment of a compressed air filter;

FIG. 6 is a top view of the compressed air filter of FIG. 5;

FIG. 7 is a side view of the compressed air filter of FIG. 5;

FIG. 8 is another side view of the compressed air filter of FIG. 5;

FIG. 9 is a perspective view of a divider of the compressed air filter of FIG. 5;

DETAILED DESCRIPTION

Figure 4:
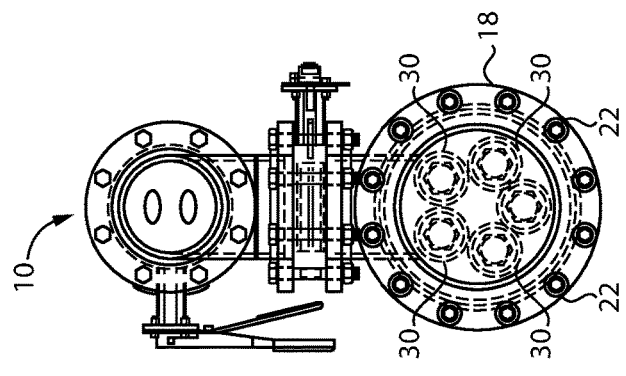
FIG. 4 is an end view of the compressed air filter of FIG. 1.
Figure 2:
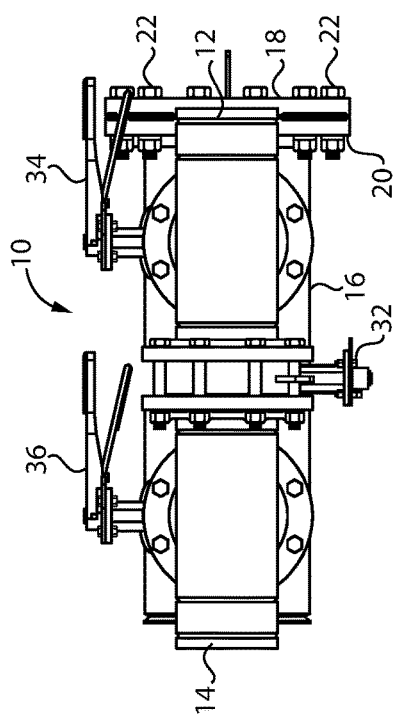
FIG. 2 is a top view of the compressed air filter of FIG. 1.
Figure 3:
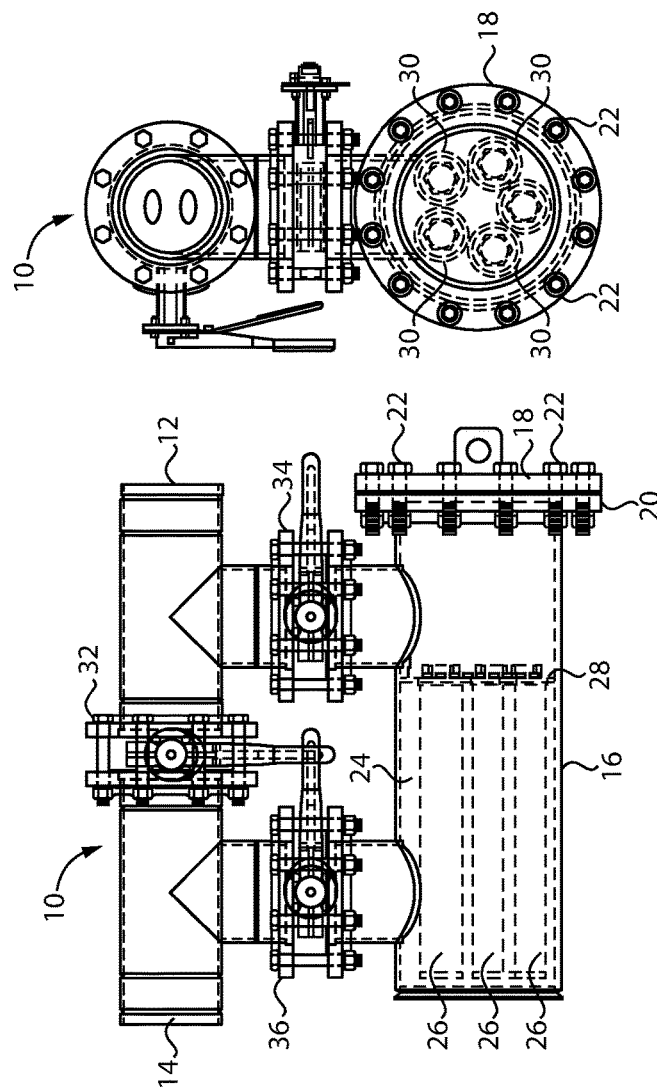
FIG. 3 is a side view of the compressed air filter of FIG. 1.

Referring now to the figures, and particularly FIGS. 1-4, one embodiment of a compressed air filter 10 is shown. In this arrangement, the air inlet 12 and the air outlet 14 are axially aligned with each other and are parallel to the tubular filter housing 16. The air inlet 12 and the air outlet 14 are also both connected to the filter housing 16. In use, the air inlet 12, air outlet 14 and filter housing 16 are preferably oriented horizontally. The filter housing 16 is also enclosed by a base 18 at one end. The other end of the filter housing 16 may be enclosed by an end of the filter housing 16 itself. The base 18 may be a plate that is bolted to a flange 20 of the filter housing 16 with threaded screws 22. The filter housing 16 and the base 18 form an enclosed space 24 therein which is capable of containing the compressed air, which typically has a pressure of between 100 psi and 200 psi but could be as high as 1,000 psi.

One or more filter elements 26 are located inside of the enclosed space 24 to filter the compressed air as it flows from the air inlet 12 to the air outlet 14. That is, the air inlet 12 is in communication with one side of the filter elements 26, and the air outlet 14 is in communication with the other side of the filter elements 26. As a result, the compressed air must pass through the filter elements 26 as it flows from the air inlet 12 to the air outlet 14. By passing through the filter elements 26, which include a fine porous structure, foreign particles are trapped within the filter elements 26 and prevented from passing to the air outlet 14. Over time, the filter elements 26 become clogged with foreign particles and may need to be removed and replaced. As described further below, the filter housing 16 and the base 20 are removably fastened together to allow the filter housing 16 and base 18 to be separated in order to remove and replace the filter elements 26.

Figure 1:
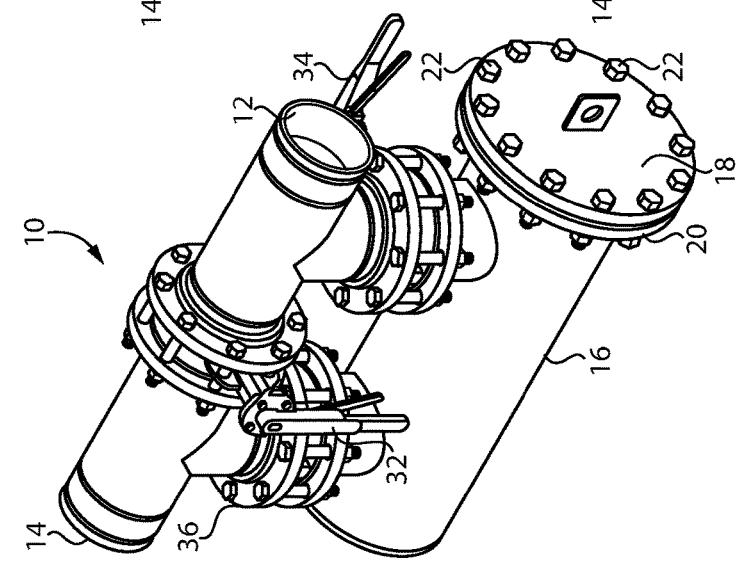
FIG. 1 is a perspective view of one embodiment of a compressed air filter.
Figure 11:
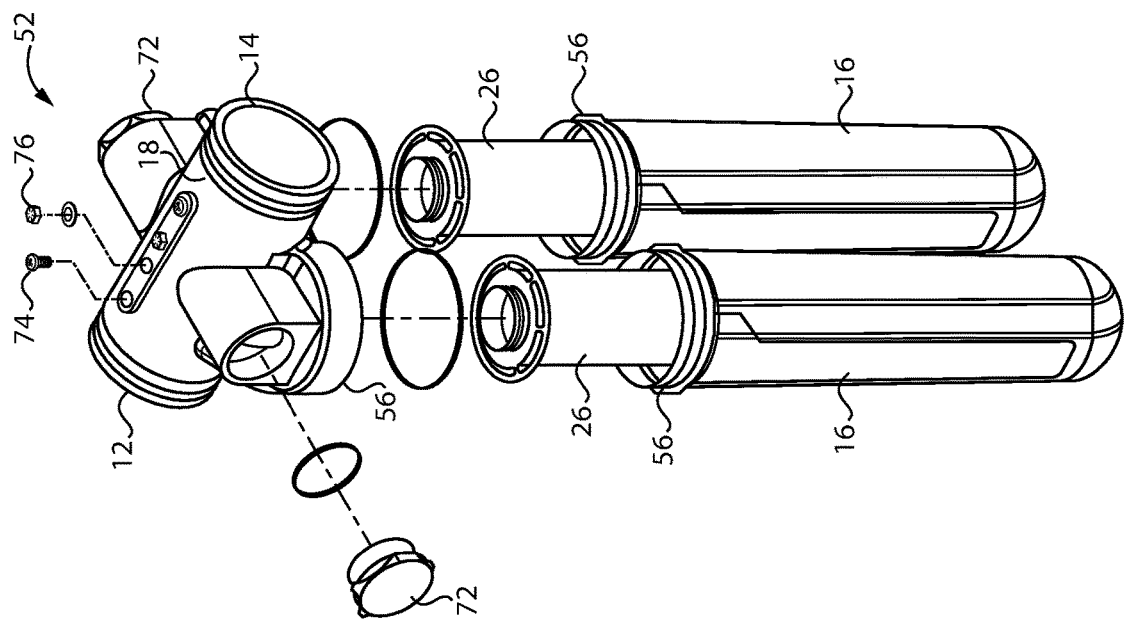
FIG. 11 is an exploded view of the compressed air filter of FIG. 10.
Figure 10:
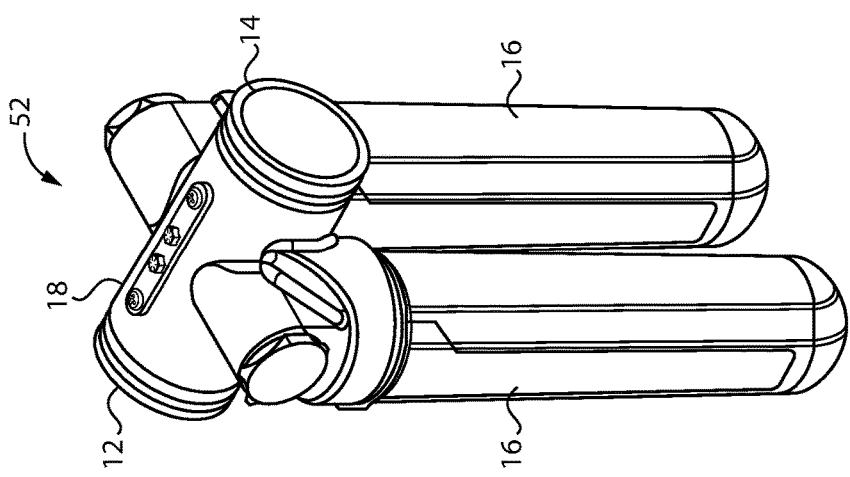
FIG. 10 is a perspective view of another embodiment of a compressed air filter.
Figure 12:
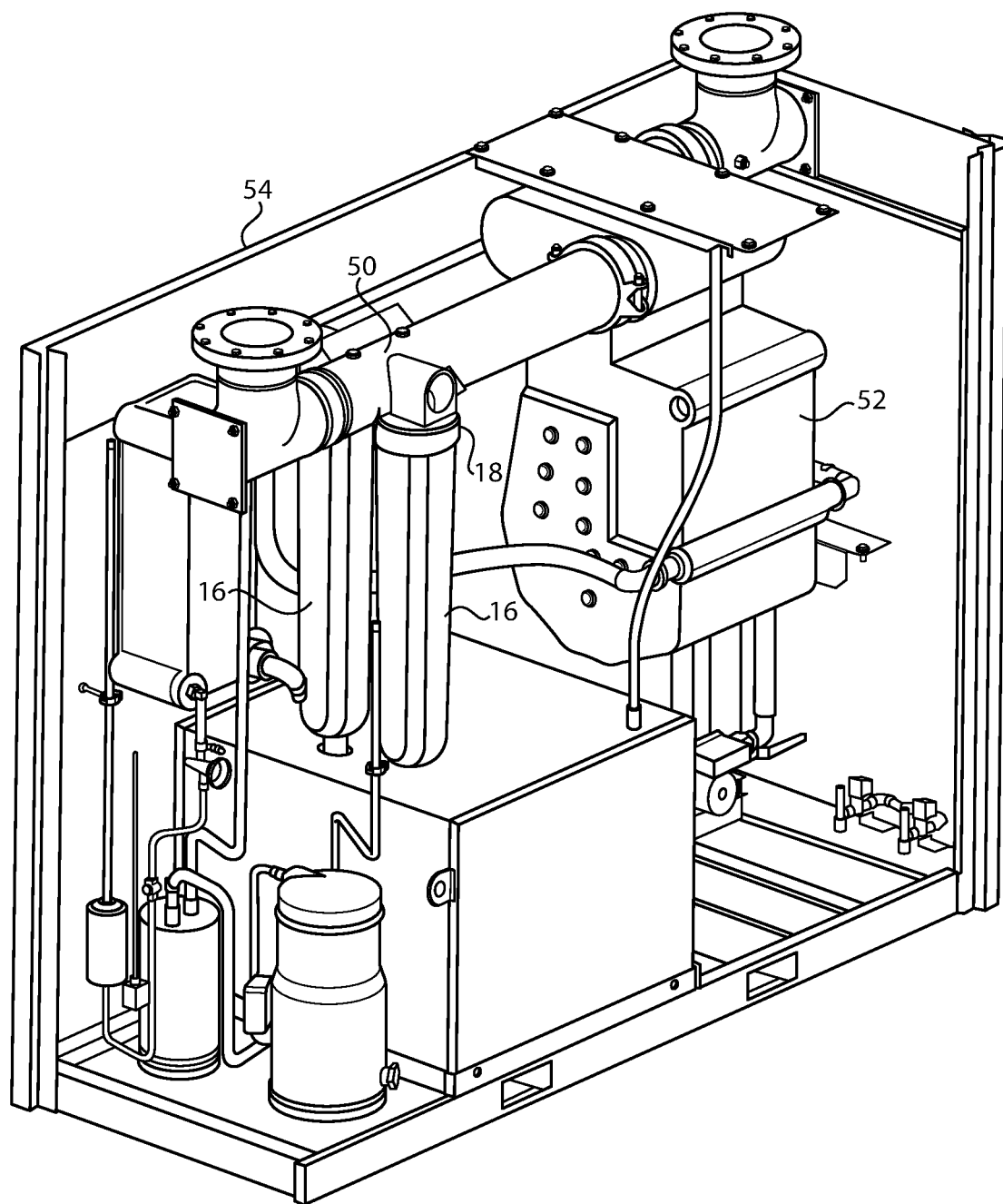
FIG. 12 is a perspective view of an air dryer system with the compressed air filter of FIG. 10.

In the preferred embodiments, the filter elements 26 are tubular with an inner diameter and an outer diameter. Even more preferably, the inner diameter (i.e., the first side) is in communication with the air inlet 12, and the outer diameter (i.e., the second side) is in communication with the air outlet 14. Thus, air flows through the filter element 26 from the inside of the tubular filter 26 to the outside of the filter element 26. In the embodiment of FIG. 1, the filter housing 16 encloses a plurality of filter elements 26 ((e.g., five filter elements 26). One end of the filter elements 26 may be connected to a divider 28 with openings 30 aligned with the inner diameters of the filter elements 26. The divider 28 prevents air from flowing directly between the air inlet 12 and the air outlet 14, and instead, forces the air to flow through the filter elements 26 in order to reach the air outlet 14. In this case, air flows through the openings 30 in the divider 28 to the inside of the filter elements 26. The air then flows through the tubular wall of the respective filter element 26 to reach the air outlet 14. The divider 28 and filter elements 26 may be restrained longitudinally within the filter housing 16 with a snap fit or with a longitudinal portion that abuts the base 18.

A valve system may also be provided to allow the filter elements 26 to be removed and replaced without shutting down air flow between the air inlet 12 and the air outlet 14. For example, a first valve 32 may be located between the air inlet 12 and the air outlet 14. A second valve 34 and a third valve 36 may be located, respectively, between the air inlet 12 and the filter housing 16 and between the air outlet 14 and the filter housing 16. In normal operation, the first valve 32 will be closed and the second and third valve 34, 36 will be opened. This prevents direct flow between the air inlet 12 and the air outlet 14, and forces air to flow from the air inlet 12 to the filter housing 16 and from the filter housing 16 to the air outlet 14. However, when it is desired to remove and replace the filter elements 26, the first valve 32 may be opened and the second and third valves 34, 36 may be closed. This allows unfiltered compressed air to flow directly from the air inlet 12 to the air outlet 14 and prevents air from flowing to the enclosed space 24 in the filter housing 16. The filter elements 26 may then be removed and replaced by removing the threaded screws 22 and the base plate 18 to access the enclosed space 24. Once new filter elements 26 have been installed, the base plate 18 can be re-fastened and the valves 32, 34, 36 changed to normal operation. Thus, the advantage of this arrangement is that it is not necessary to shut off compressed air flow through the system in order to change the filter elements 26.

The embodiment of FIGS. 5-9 shares numerous features with the previous embodiment, and thus, only additional or different features need to be described for an understanding of FIGS. 5-9. In this embodiment of the filter 38, the tubular housing 16 is oriented transversely to the air inlet 16 and the air outlet 14. In use, the tubular housing 16 is preferably oriented vertically, with the air inlet 12 and air outlet 14 being oriented horizontally. The air inlet 12 and the air outlet 14 may be axially aligned with each other on opposite sides of the filter housing 16. The base 18 may be located at the bottom of the filter housing 16.

The base 18 may be connected to the filter housing 16 with a hinge 40 so that when the threaded screws 42 are removed, the base 18 rotates away from the filter housing 16 to separate therefrom to allow the filter elements 26 to be removed and replaced, while still retaining the base 18. The threaded fasteners 42 may also be rotatably connected to the filter housing 16, and slotted retainers 44 may be provided on the base 18 (or vice versa) to allow the threaded screws 42 to be loosened and rotated away from the slotted retainers 44 to separate the filter housing 16 and the base 18.

Like the embodiment of FIGS. 1-4, the divider 28 may have openings 30 which are connected to individual filter elements 26 to allow air flow into the center of the tubular filter elements 26. The portion 46 of the divider 28 with the openings 30 is oriented transversely within the filter housing 16 with the circular side of the transverse portion 46 sealing against the inside of the filter housing 16. The divider 28 may also have another portion 48 that is oriented longitudinally within the filter housing 16. The sides of the longitudinal portion 48 also seal against the inside of the filter housing 16. The longitudinal portion 48 is useful to block air flow directly between the air inlet 12 and the air outlet 14 where the inlet 12 and the outlet 14 are both connected to the filter housing 16 on opposite sides thereof. Also, the longitudinal portion 48 may abut against an end of the filter housing 16 to position the transverse portion 46 and filter elements 26 at the desired location.

The embodiment of FIGS. 10-15 also shares numerous features with the previous embodiments, and thus, only additional or different features need to be described. The compressed air filter 50 of FIGS. 10-15 is shown in relation to an air dryer 52 in FIG. 12. That is, the filter 50 is preferably located in the compressed air system immediately before the air dryer 52, and preferably within the air dryer system housing 54. The air dryer 52 may be a conventional air dryer 52 which is known in the art to remove moisture from the compressed air. In order to prevent damage to the air dryer 52, the filter 50 is located on the inlet side of the air dryer 52 to filter the compressed air before it flows through the air dryer 52. It is understood that this same arrangement preferably applies to all of the embodiments herein.

Unlike the previous embodiments, the air inlet 12 and the air outlet 14 are preferably formed into the base 18 in the present embodiment. Also, it is preferable for two filter housings 16 to be provided located side-by-side on opposite lateral sides of the air inlet 12 and the air outlet 14. Each of the filter housings 16 are separately fastened to the base 18 (e.g., with a threaded connection 56 between each filter housing 16 and the base 18) to form two separate enclosed spaces 24. A separate filter element 26 is also located in each filter housing 16. In use, the filter housings 16 extend downward (that is, transversely) with respect to the air inlet 12 and the air outlet 14 which are at the top.

Figure 13:
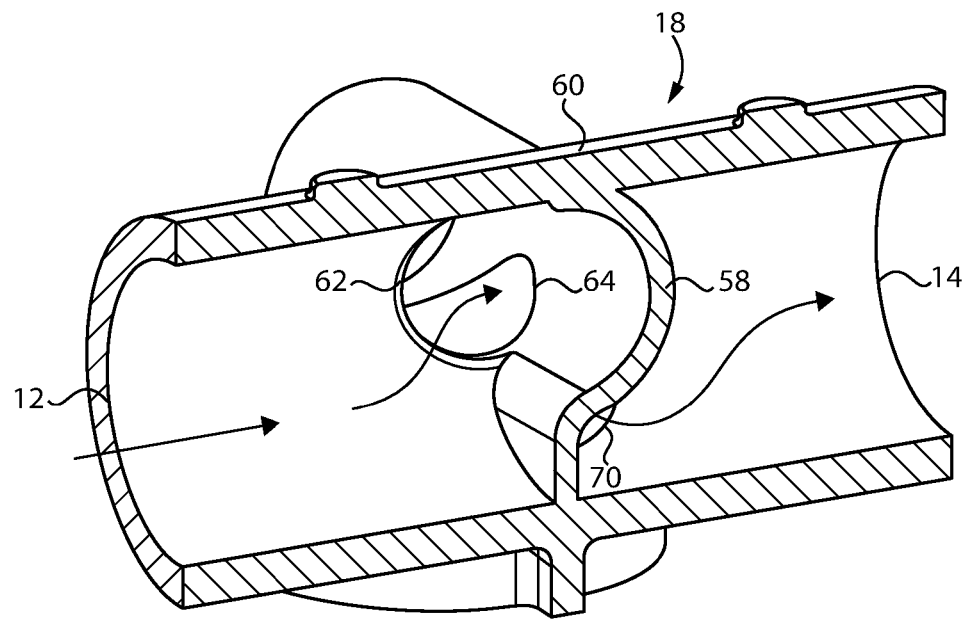
FIG. 13 is a cross-sectional perspective view of he base of the compressed air filter of FIG. 10.
Figure 14:
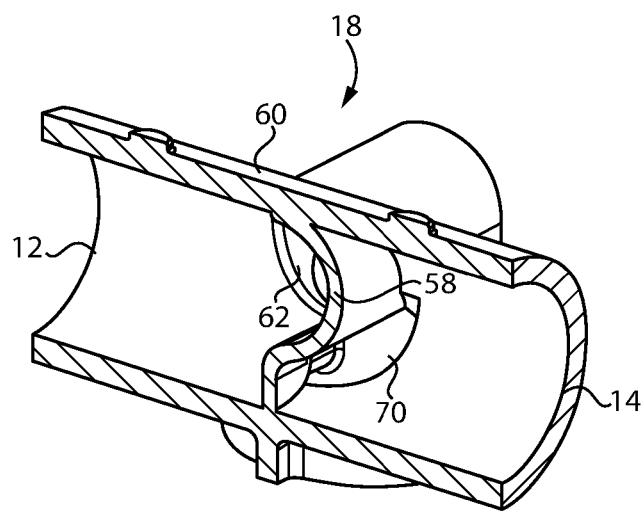
FIG. 14 is another cross-sectional perspective view of the base of the compressed air filter of FIG. 10.
Figure 15:
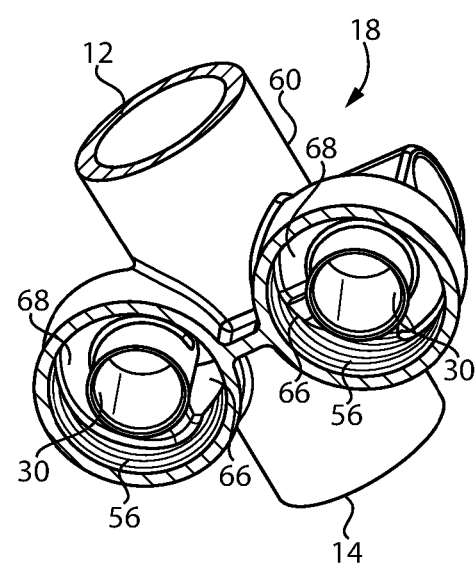
FIG. 15 is a perspective view of the bottomof the base of the compressed air filter of FIG. 10.

Turning to FIGS. 13-15, a divider 58 may be provided within the tubular section 60 defining the air inlet 12 and the air outlet 14 to prevent direct air flow therebetween. A side opening 62 on each opposite side of the air inlet 12 allows air to pass to a respective vertical opening 64 that is in communication with the interior of the respective filter element 26. Thus, the side openings 62 and vertical openings 64 form first passages between the air inlet 12 and the filter elements 26. After passing through the side wall of the respective filter element 26, the compressed air flows up through the annular space between the outer surface of the filter element 26 and the inner surface of the filter housing 16. The air then passes to a vertical opening 66 in the annular space 68 of the base 18. From there, the air passes through respective side openings 70 on opposite sides of the central tubular section 60 to the air outlet 14. Thus, the vertical openings 66 and side openings 70 form second passages between the air outlet 14 and the filter elements 26.

Preferably, the base 18 is an integral molded component (e.g., a casting) made of metal (e.g., aluminum). Thus, the air inlet 12, air outlet 18, divider 58, first passages 62, 64, and second passages 66, 70 are all integrally molded together in a singular, undivided component. In order to allow the side openings 62 to be machined after molding, the side openings 62 are formed all the way through the base 18 from side to side, and threaded plugs 72 are fastened into the ends of the side openings 62 after machining to dose the openings 62. It may also be desirable to provide two pressure sensors 74 threaded into the base 18, with one being in communication with the air inlet 12 and the other being in communication with the air outlet 14 in order to measure the air pressure drop across the filter elements 26 and determine when the filter elements 26 need to be removed and replaced. Threaded fasteners 76 may also be threaded into the top of the base 18 in order to mount the filter 50 in the air dryer assembly 54 and fix the angular position of the filter 50.

Figure 16:
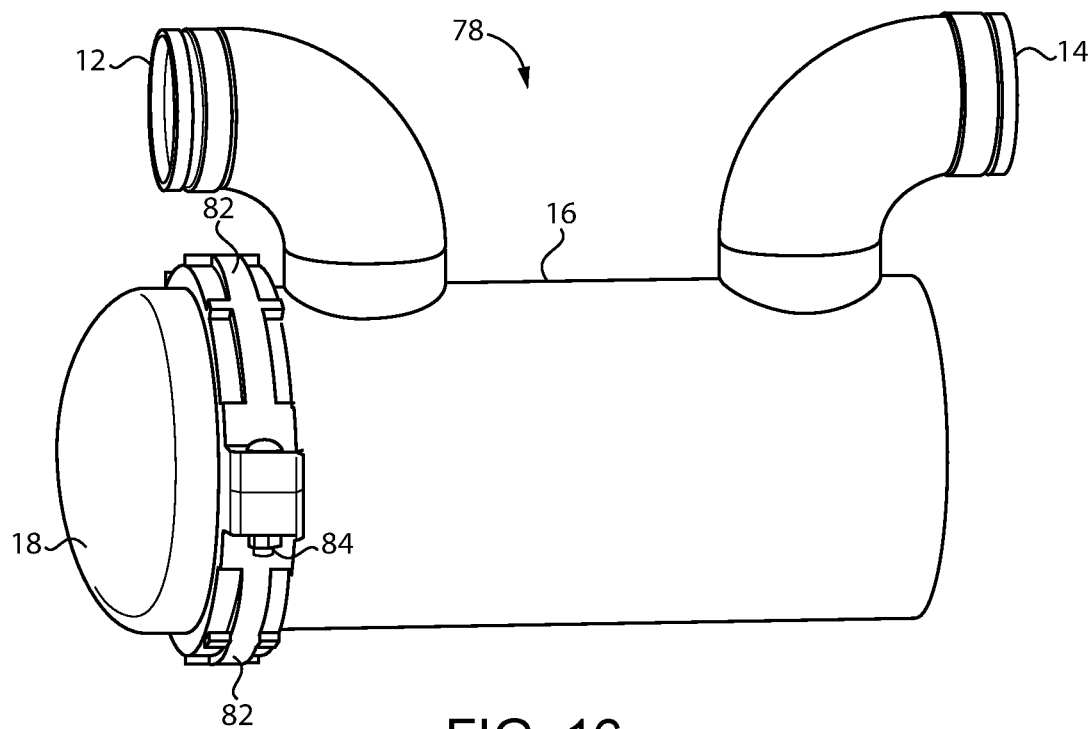
FIG. 16 is a side perspective view of another embodiment of a compressed air filter.
Figure 17:
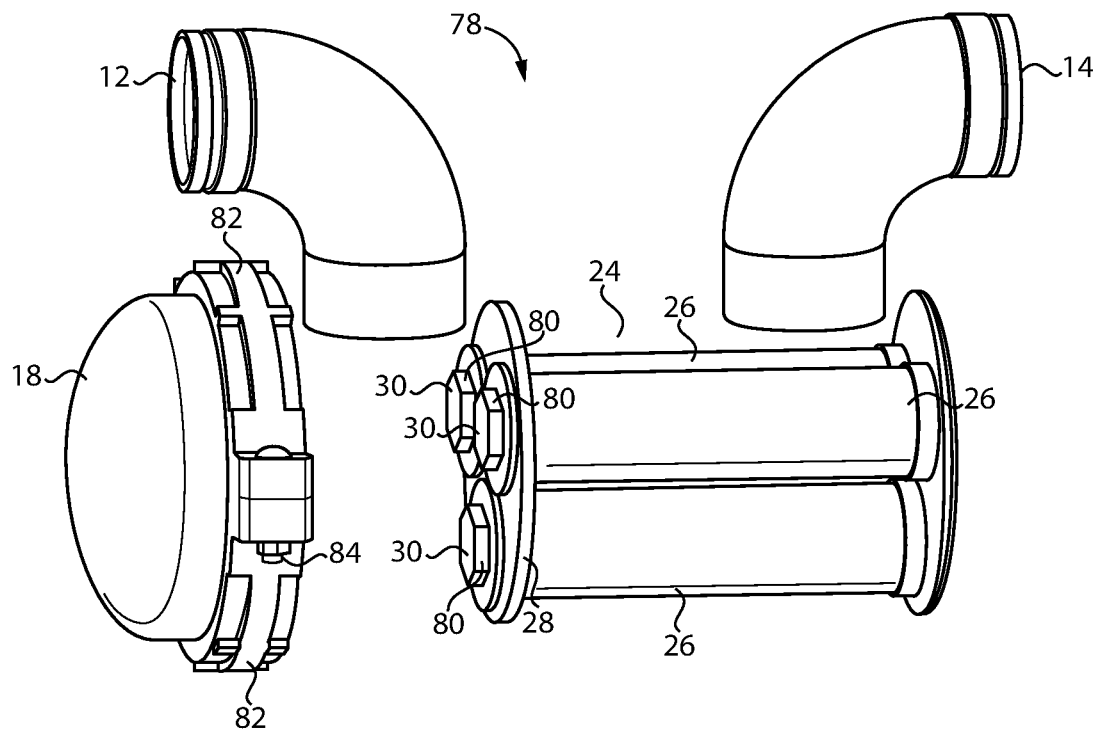
FIG. 17 is a side perspective view of the compressed air filter of FIG. 16 with the outside of the filter housing removed.

The embodiment of FIGS. 16-17 also shares numerous features with the previous embodiments, and thus, only additional or different features need to be described. Like the embodiment of FIGS. 1-4, the filter 78 of FIGS. 16-17 will typically be oriented horizontally in use. That is, the air inlet 12 and air outlet 14 are parallel to the filter housing 16. In FIG. 17, the tubular portion of the filter housing 16 has been omitted to illustrate the enclosed space 24 therein. In this embodiment, it may be desirable to weld the divider 28 inside of the filter housing 16 to seal the divider 28 and fix the divider 28 in place. Threaded nuts or snaps 80 with openings therethrough may be used to fix the filter elements 26 to the openings 30 in the divider 28. In this embodiment, a clamp 82 may also be used to fastened the base 18 to the filter housing 16. Preferably, the clamp 82 surrounds the end of the filter housing 16 and the end of the base 18. The clamp 82 may be a two-piece clamp 82 tightened with threaded screws 84.

Figure 18:
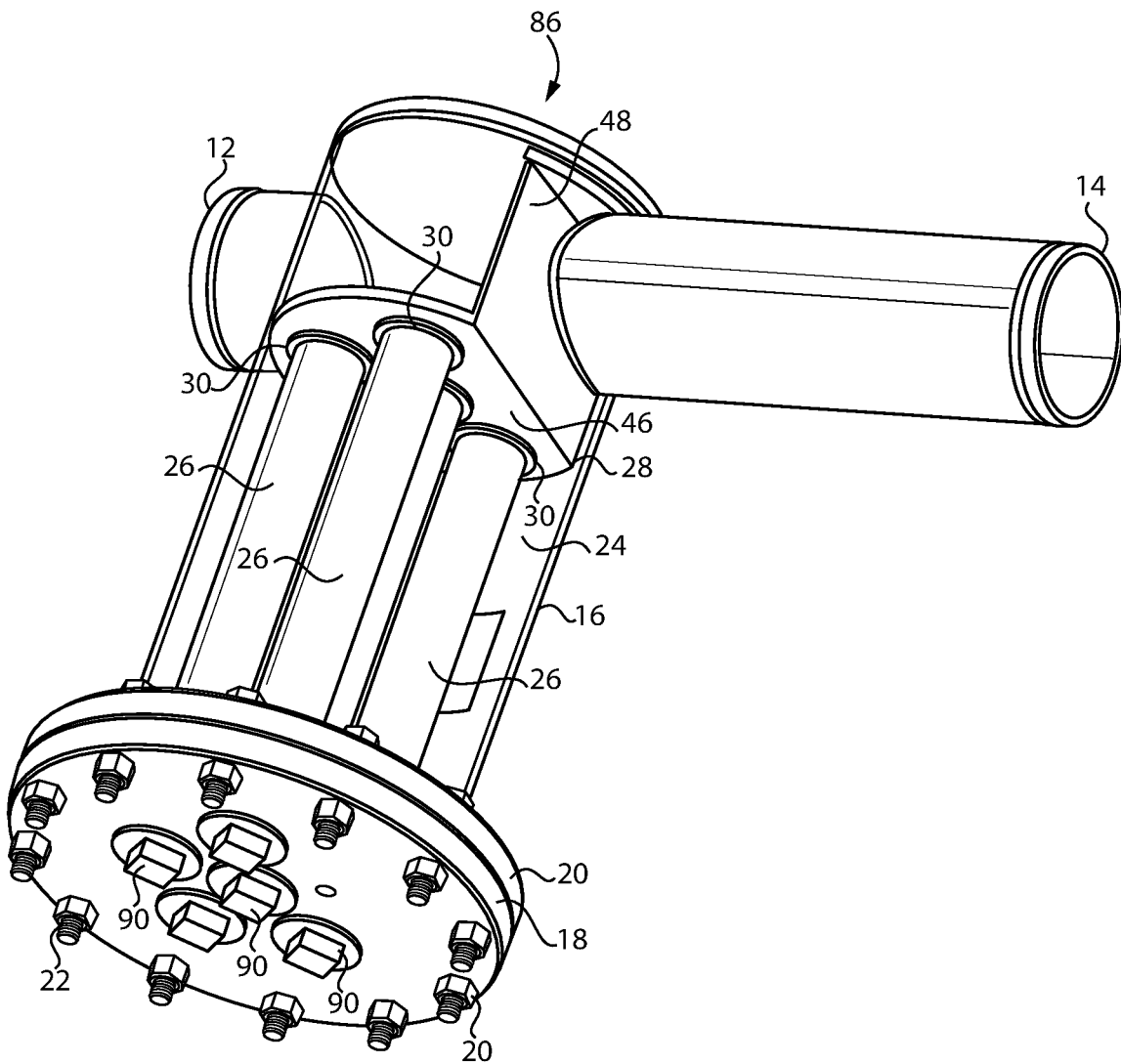
FIG. 18 is a perspective view of another embodiment of a compressed air filter.
Figure 19:
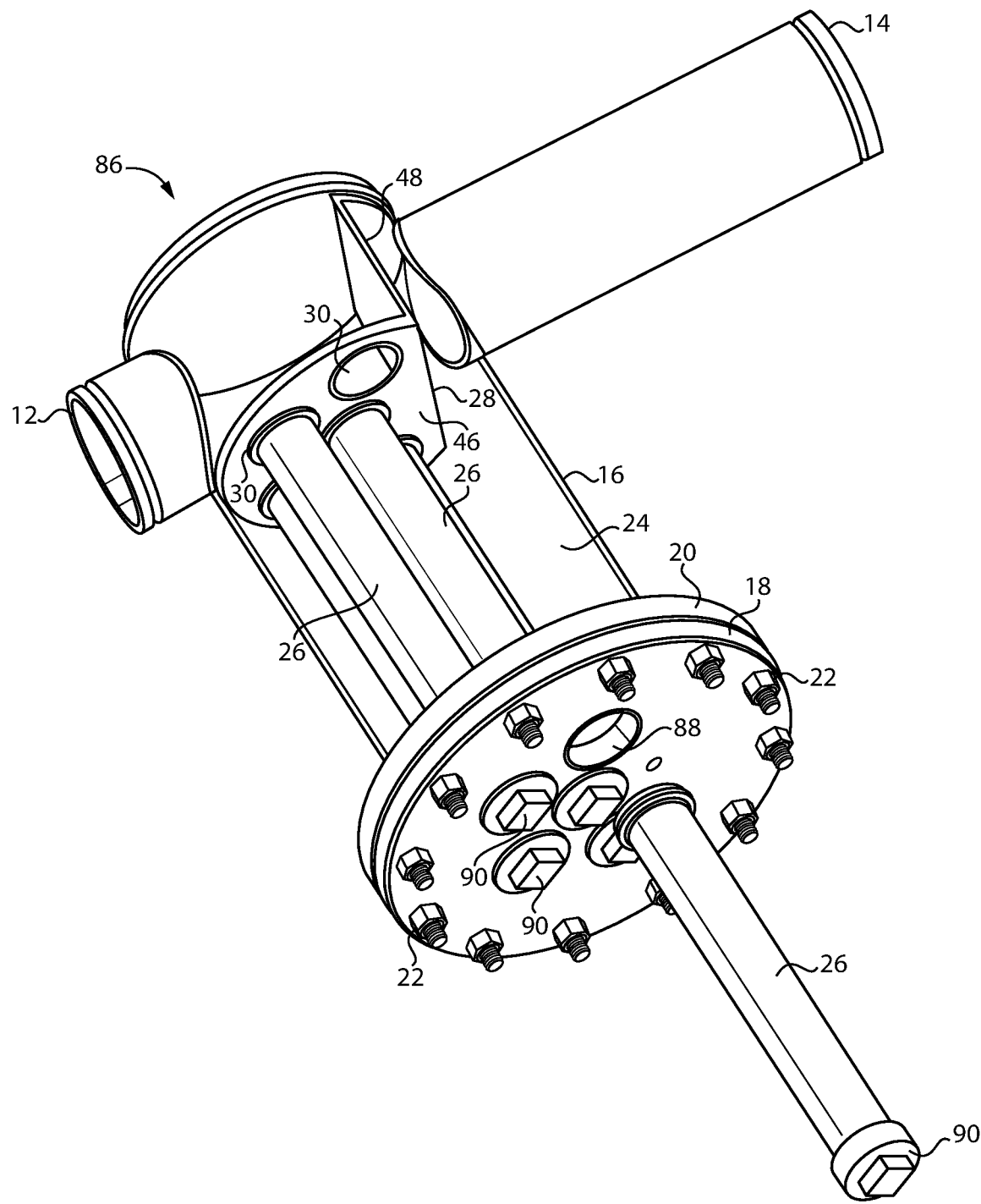
FIG. 19 is a perspective view of the compressed air filter of FIG. 18 showing a filter element being removed.

The embodiment of FIGS. 18-19 also shares numerous features with the previous embodiments, and thus, only additional or different features need to be described. Like the embodiment of FIGS. 5-9, the filter housing 16 of FIGS. 18-19 will typically be oriented vertically in use. In this embodiment of the filter 86, individual filter elements 26 may be removed and replaced through corresponding openings 88 in the base 18. Thus, it may not be necessary to separate the base 18 from the filter housing 16 to remove and replace the filter elements 26. However, if it is desired to access the enclosed space 24 and remove and replace the filter elements 26, as well as inspect the divider 28, the base 18 may still be removed by loosening the threaded screws 22. The filter openings 88 in the base 18 may be dosed with threaded plugs 90.

It is understood that in each of the embodiments it is preferably to provide a drain to allow fluids that collect in the filter to be removed. It is also preferable in each embodiment to provide pressure measurement ports at both the inlet and outlet of the filter to measure the pressure differences, and thus, the condition of the filter elements (i.e., degree of clogging).

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A filter for a compressed air system, comprising:
a filter housing;
a base enclosing one end of the filter housing, the filter housing and the base defining an enclosed space configured to house a plurality of filter elements, the base defining a plurality of openings configured to receive a respective filter element among the plurality of filter elements for removal and replacement of the respective filter element; and
an air inlet and an air outlet defined by the filter housing or the base, wherein the air inlet is configured to be in fluid communication with a first side of each filter element and the air outlet is configured to be in fluid communication with a second side of the each filter element such that airflow from the air inlet to the air outlet passes through the respective filter element.

2. The filter according to claim 1, wherein each filter element is tubular, the first side of each filter element being one of an inner diameter or an outer diameter of the filter element, and the second side of each filter element being another of the inner diameter or the outer diameter of each filter element.

3. The filter according to claim 2, wherein the first side of each filter element is the inner diameter of the filter element, and the second side of each filter element is the outer diameter of the filter element.

4. The filter according to claim 1, wherein compressed air flowing from the air inlet to the air outlet through the plurality of filter elements is between 100 psi and 200 psi.

5. The filter according to claim 1, wherein the air inlet and/or the air outlet is connected to the filter housing, and further comprising a divider disposed within the filter housing to prevent direct airflow between the air inlet and the air outlet.

6. The filter according to claim 5, wherein the plurality of filter elements are connected to the divider such that one of the first and second sides of the filter elements is exposed to one side of the divider and another of the first and second sides of the filter elements is exposed to another side of the divider.

7. The filter according to claim 6, wherein the air inlet and the air inlet are both connected to a side of the filter housing, the filter housing being tubular in shape, and the divider comprising a first portion oriented transversely relative to the filter housing and a second portion oriented longitudinally relative to the filter housing, the plurality of filter elements being connected to the first portion of the divider.

8. The filter according to claim 1, wherein the base and the filter housing are fastened together with one or more threaded fasteners.

9. The filter according to claim 8, wherein the base and the filter housing are fastened together with a clamp.

10. The filter according to claim 1, wherein the base and the filter housing are removably fastened together such that the base and the filter housing may be separated from each other to permit the plurality of filter elements to be removed and replaced.

11. The filter according to claim 10, further comprising a hinge between the base and the filter housing.

12. The filter according to claim 10, wherein the filter housing is tubular in shape, the filter housing oriented parallel to the air inlet and the air outlet.

13. The filter according to claim 10, wherein the filter housing is tubular in shape, the filter housing oriented transversely to the air inlet and the air outlet.

14. The filter according to claim 1, wherein the opening is closed with a threaded fastener.

15. The filter according to claim 1, further comprising a first valve between the air inlet and the air outlet, a second valve between the air inlet and the enclosed space, and a third valve between the air outlet and the enclosed space, wherein compressed air flows unfiltered between the air inlet and the air outlet when the first valve is opened, and compressed air does not flow to the enclosed space when the second valve and the third valve are closed, the base and the filter housing being separable to remove and replace the plurality of filter elements while unfiltered compressed air continues to flow from the air inlet to the air outlet.

16. A compressed air system, comprising:
a filter for compressed air, including:
  a filter housing;
  a base enclosing one end of the filter housing, the filter housing and the base defining an enclosed space for housing a filter element, the base defining at least one circular opening that is closed with a threaded plug, the circular opening configured to receive the filter element for removal and replacement of the filter element; and
  an air inlet and an air outlet defined by the filter housing or the base, wherein the air inlet is configured to be in fluid communication with a first side of the filter element and the air outlet is configured to be in fluid communication with a second side of the filter element such that airflow from the air inlet to the air outlet passes through the filter element; and
an air dryer for removing moisture from the compressed air;
wherein the filter is disposed on an inlet side of the air dryer to thereby filter the compressed air before the compressed air flows through the air dryer.

* * * * *